July 18, 1944.   P. SCHWARZ   2,353,855
VEHICLE JACK
Filed Dec. 10, 1942
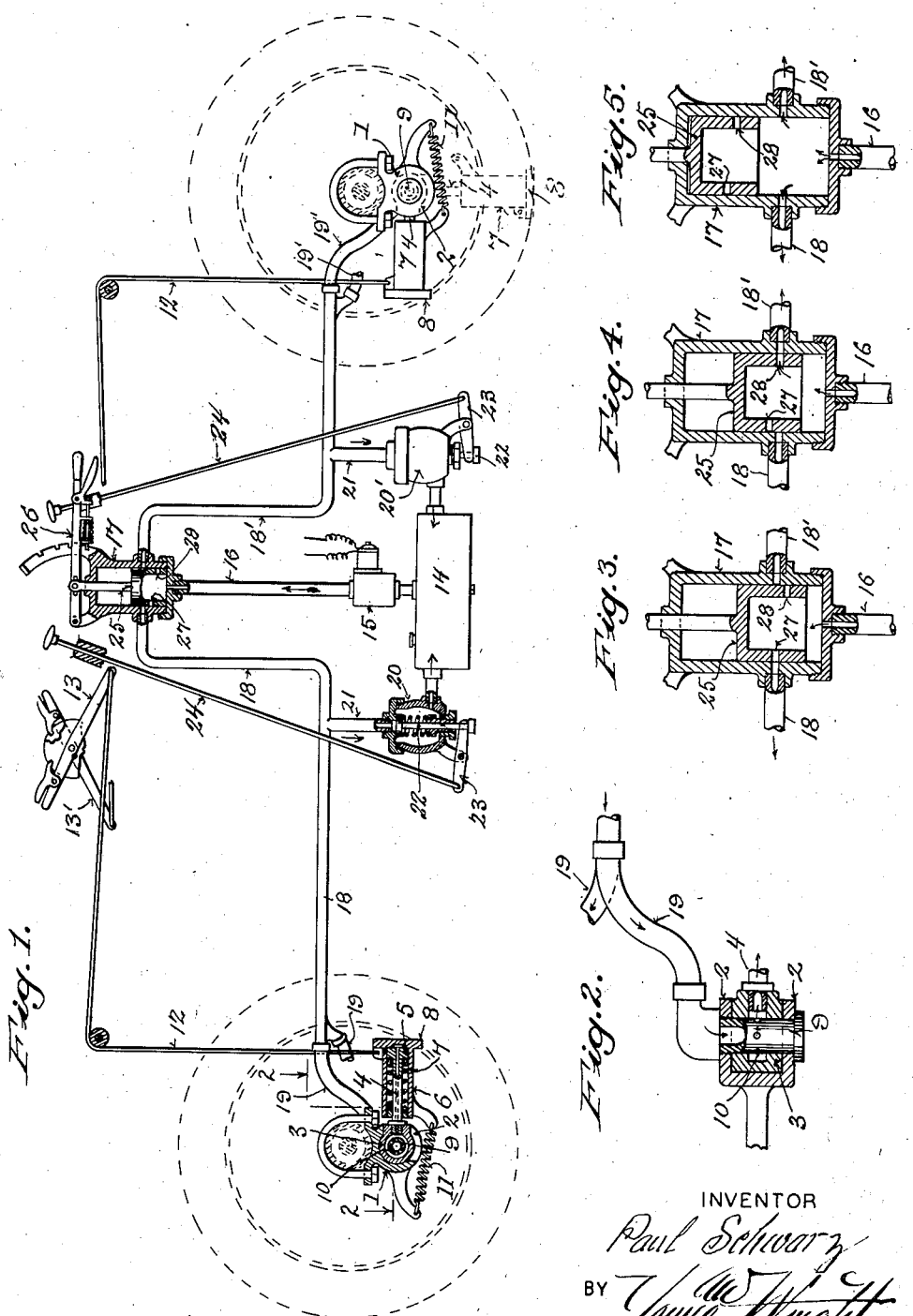
INVENTOR
Paul Schwarz
BY
ATTORNEYS Patented July 18, 1944

2,353,855

UNITED STATES PATENT OFFICE 2,353,855

VEHICLE JACK

Paul Schwarz, Milwaukee, Wis.

Application December 10, 1942, Serial No. 468,517

1 Claim. (Cl. 254—86)

This invention appertains to motor vehicles and it has for its object to provide a set of lifting jacks, one for the set of rear wheels and another for the set of front wheels, whereby the sets may be simultaneously or independently raised through a fluid means control by the driver selectively by proper manually actuated means.

With the above and other minor objects in view of the invention consists in certain peculiarities of construction and arrangement of parts, as will be fully set forth in connection with the accompanying drawing and subsequently claimed.

In the drawing:

Figure 1 represents a diagrammatic view of sets of lifting jacks attached to a vehicle and actuating means therefore embodying the features of my invention, parts being broken away and in section to more clearly illustrate structural details.

Figure 2 is a cross section view of one of the jack couplings, the section being indicated by line 2—2 of Figure 1.

Figures 3, 4, and 5 are enlarged sectional elevational views of a valve for controlling the jacks illustrating the three movements of the valve for selectively actuating the rear set of jacks, the front set of jacks and simultaneously the two sets of jacks.

Referring by characters to the drawing 1 indicates coupling units attachable to the front and rear axles of a vehicle, each having a circular bore and spaced centrally apertured ears 2. Fitted into each coupling bore is a circular hollow hub 3, carrying a hollow piston rod 4, which rod terminates with a piston head 5. The rod and piston are encased within a cylindrical boot 6, in slidable union with the rod and piston head. Interposed between one end of the cylinder and the piston head is a coil spring 7. This coil spring 7 serves to hold the two parts in contracted telescopic union under normal conditions. These cylindrical boots, as shown, each carry any suitable ground gripping shoe 8.

Centrally mounted within the ear apertures of the couplings is a hollow spindle 9, having a set of fluid discharge apertures 10 in communication with the hollow hub 3.

When the pivotal jacks are in use, they are held in a vertical position, as shown in Figure 1, under tension of springs 11, which connect the shoe portion of the cylinder and an ear extension of the coupling 1.

The front and rear set of jacks are locked in their inactive positions, by runners 12 and 12 connected to the shoe portion of the jacks, trained over rollers and secured to independent actuating levers 13 and 13', which levers are carried by a detent as shown, adapted to lock the jacks in inactive positions, it being understood that said levers are within convenient reach of the driver.

The jacks are preferably actuated by oil under pressure, from an over-flow reservoir 14 carried by the chassis of the vehicle in any suitable manner. The reservoir is suitably piped to a motor driven pump 15, and a discharge pipe 16 of which pump communicates with the bottom of a controlling valve casing 17. A fluid supply pipe 18 leads from the side wall of the valve casing to the rear set of jacks (only one of which is shown).

Flexible coupling pipe sections 19 connect the end of the fluid supply pipe 18 to the spindles 9 whereby vibration between the pipe and axle is absorbed.

The forward set of jacks is similarly connected to the valve casing 17 by a fluid supply pipe 18' and coupling connections 19' similarly connect the front housing units of said front jacks, which jacks are similar to the rear jacks previously described, it being understood that the ends of the pipes 18 and 18', in communication with the master control valve casing 17 are upon the same horizontal plane.

Independent spring control pressure relief valves 20, 20' are connected by branch pipes 21, 21' to the front and rear fluid supply pipes 18, 18' and said relief valves 20, 20' are each also in pipe connection with the over-flow fluid reservoir. The relief valves are of any standard type and embody essentially a spring controlled valve unit 22 whereby excess pressure of fluid from the main supply pipes, will automatically open the valve and cause the fluid to circulate back into the reservoir under certain conditions.

Briefly, when the fluid pressure in the jack boots or cylinders is abnormally high relative to the sustaining load, it may cause a blow-out or disrupt the system, hence at a predetermined load pressure said relief valves will automatically release and permit the excess pressure to flow back into the reservoir.

The pressure regulating relief valves 20 are manually controlled by oscillating levers 23, associated with the valve unit 22 and said levers may be manually actuated by runners 24 within easy reach of the driver.

From the foregoing description it will be understood that when the driver desires to utilize the rear set of jacks, the lever 13 is released, whereby the jacks will, through spring control, assume a vertical working position under the axle.

The master controlling valve, as shown, is provided with a hollow piston sleeve 25, having a stem extending through the casing, which stem in this instance is reciprocatively actuated by a locking lever 26 associated with a suitable detent. The piston sleeve, as noted, is open at its bottom end and the side walls thereof are provided with a port 27 adapted to communicate with the master fluid supply pipe 18 and a similar port 28, upon a different horizontal plane from the first mentioned port, is adapted to communicate with the front jack master fluid supply pipe 19', which fluid supply is distributed from the pump pipe 16.

As shown in Figure 1 of the drawing, when the piston sleeve 25 is in its extreme bottom position, with reference to the valve casing 17, the supply of fluid from the pipe 16, is completely cut off. As best shown in Figure 5 of the drawing, when it is desired to actuate simultaneously, both the front and rear sets of jacks, the valve sleeve is raised to its extreme high position, with reference to the casing, whereby the front and rear supply pipes are placed in direct communication with the pump and supply pipe 16.

From the foregoing description, with reference to the main control valve, in the event that the rear valves are to be utilized for lifting purposes, the piston sleeve 25, is moved into position as shown in Figure 3 of the drawing, hence the supply of oil is directed into the rear jack units, whereby they are raised, it being understood that the pump motor is functioning. In the event that the pressure accumulated by the pump to the rear jacks is excessive, the relief valve 20 will open, whereby the pump will simply cause a short circuit of the fluid, from the main line 18 to the over-flow reservoir 14 and back to the controlling valve. This same operation can be accomplished in connection with the front set of jacks.

When it is desired to lift the rear jacks from their working position, the operator will manually open the relief valve 20, which relief valve is associated with the supply pipe 18, whereby pressure is relieved from pipe 18 to permit the rear jacks to telescope and swing upon their axes, when the lever 13 is actuated to manually lift the rear valves to the position shown in Figure 1. The front set of jacks are operated in a similar manner when the controlling valve is moved to the position indicated in Figure 4 of the drawing, and obviously when it is desired to simultaneously lift both sets of jacks the controlling valve is moved to the position indicated in Figure 5.

While I have minutely described a mechanism for accomplishing the desired results with reference to the simultaneous movement of all valves and selective movement of sets of said valves, it is understood that I may vary the structural features within the knowledge of the skilled mechanic as exemplified in the diagrammatic drawing.

For example, the jacks may be, without departing from the spirit of the invention, arranged to be vertically raised and lowered for accomplishing the desired results.

I claim:

In a vehicle having pairs of manually controlled hydraulic jacks shiftable from idle to working position; the combination of fluid actuating means therefor comprising a fluid reservoir, a master controlling valve, a fluid feed pipe communicating with the reservoir and master controlling valve, a pump interrupting the fluid feed pipe, fluid supply pipes each connecting the master controlling valve and one pair of jacks and an automatically releasable relief valve communicating with each fluid supply pipe and the reservoir, whereby a predetermined pressure is maintained in said supply pipes, and manually controlled means for actuating the relief valves whereby fluid pressure in the pairs of hydraulic jacks is released when it is desired to relieve lifting pressure in said jacks.

PAUL SCHWARZ.